No. 693,747. Patented Feb. 18, 1902.
M. M. SINNOTT.
TIRE INFLATING DEVICE FOR VEHICLES.
(Application filed July 8, 1901.)
(No Model.)
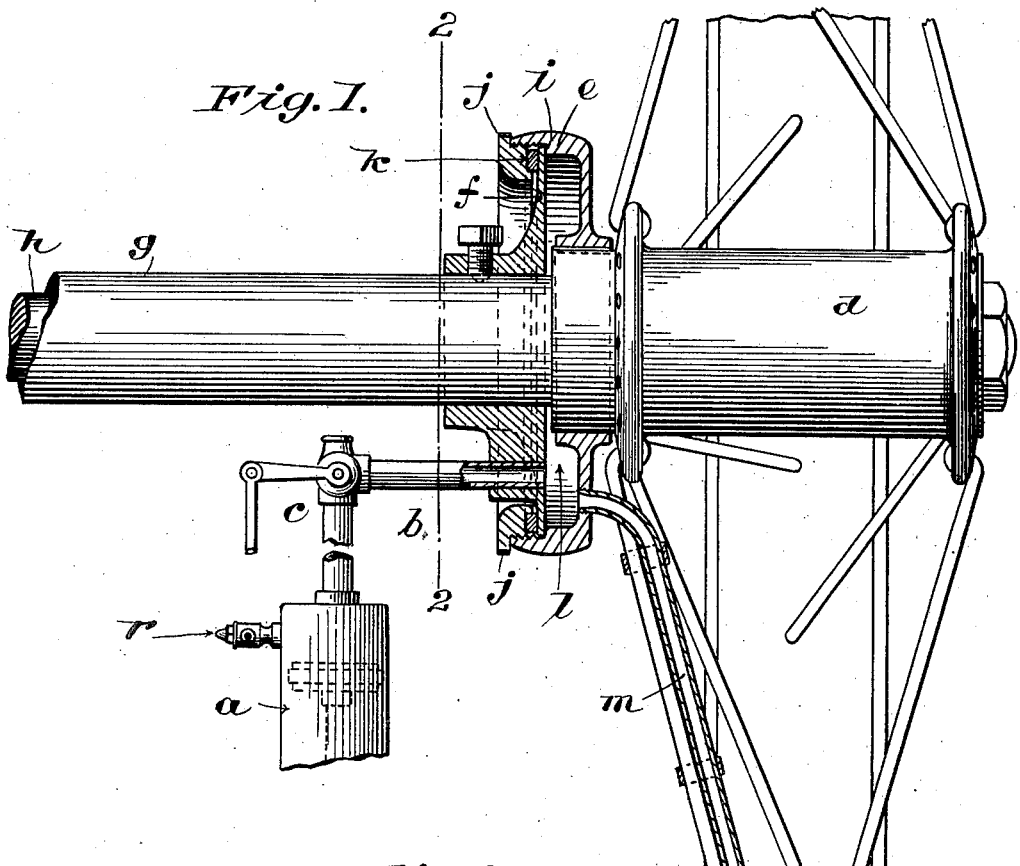
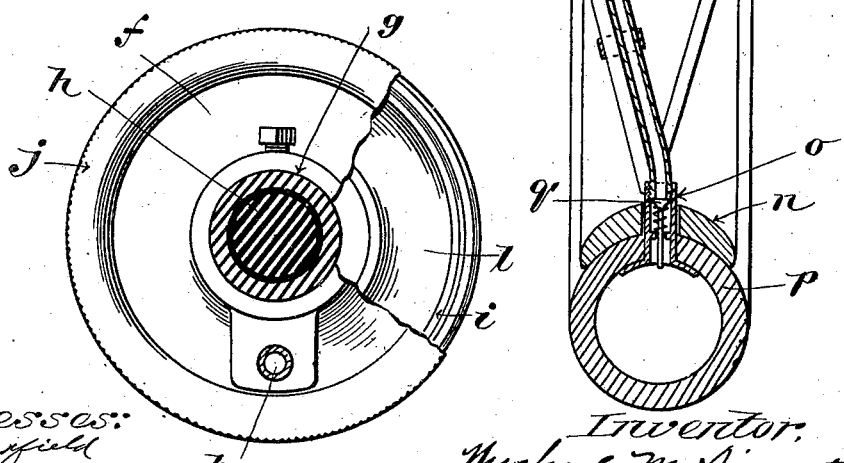

UNITED STATES PATENT OFFICE.

MICHAEL M. SINNOTT, OF NORTHAMPTON, MASSACHUSETTS, ASSIGNOR OF ONE-HALF TO JOHN WILLIAM SINNOTT, OF NORTHAMPTON, MASSACHUSETTS.

TIRE-INFLATING DEVICE FOR VEHICLES.

SPECIFICATION forming part of Letters Patent No. 693,747, dated February 18, 1902.

Application filed July 8, 1901. Serial No. 67,453. (No model.)

*To all whom it may concern:*

Be it known that I, MICHAEL MAXWELL SINNOTT, a citizen of the United States of America, residing at Northampton, in the county of Hampshire and State of Massachusetts, have invented new and useful Improvements in Tire-Inflating Devices for Vehicles, of which the following is a specification.

This invention relates to tire-inflating devices for vehicles which use pneumatic tires, the object of this invention being to provide means whereby the tires on the wheels of a vehicle may be inflated while the vehicle is in motion; and the invention is particularly applicable to self-propelled vehicles; and it consists in the construction fully described in the following specification and clearly defined in the claims.

In the drawings forming part of this specification, Figure 1 shows the end of an axle of a self-propelled vehicle and wheel thereon, showing my invention applied thereto, the tire and some of the parts being in section. Fig. 2 is a sectional view on line 2 2 looking to the right, showing the end of the vehicle-hub and a cap therefor, partly broken away.

In carrying my invention into practice in its application to a self-propelled vehicle I provide any suitable air-compressing device, which is indicated in Fig. 1 in a conventional manner by $a$. This may be mounted on the vehicle at any convenient point and driven either by connection with some rotating part of the vehicle or by a suitable pressure-actuated device, according to the type of vehicle to which it is applied.

Leading from the air-compressing device to each hub of the vehicle-wheel is a pipe $b$, in which is located a suitable valve $c$, whose functions will be described farther on. On the inner end of each of the hubs $d$ an annular casing $e$ is provided, which is secured to the hub. This annular casing is open on that side thereof next to the vehicle and is adapted to be closed by a circular head $f$, having a hub thereon which fits over the end of a stationary tubular axle-casing $g$, within which the axle $h$ is located, the wheel-hub being secured on the latter in the usual manner. The annular casing $e$ has formed on the interior thereof an annular shoulder $i$, against which the head $f$ bears lightly. While this shoulder is not essential, I prefer to construct the casing in this manner. The head $f$ may be secured to the axle-casing $g$ in any desirable manner, as by a set-screw, as shown in Fig. 1.

The inner surface of the annular casing $e$ from the edge thereof inward is screw-threaded, and a ring $j$ is screwed therein, a packing-ring $k$ of some suitable material being interposed between the ring and the head $f$, constituting an air-tight closure for the open side of the casing $e$. This construction permits the rotation of the casing $e$, the ring $j$, and its packing-ring $k$ all together, the head $f$ remaining stationary. This construction provides an annular chamber $l$ in the casing $e$, with which connection is made by the pipe $b$ to the air-compressor $a$ through the head $f$.

From any convenient point in the casing $a$ pipe $m$ extends preferably down along the side of the spoke to the rim of the wheel, (indicated by $n$,) where it is suitably connected to a tube $o$, extending through the rim and into the tire $p$. Within said tube $o$ is a check-valve $q$, of ordinary construction, held to its seat by a suitable spring and adapted to close outwardly against the end of the pipe $m$.

The valve $c$, when the air-compressor is driven by some pressure-actuated device, like a steam-cylinder, may be of ordinary construction, whereby the pipe $b$ may be closed, or it may be omitted altogether, the check-valve $q$ serving to retain the pressure in the tire $p$; but where the air-compressor is actuated by some rotating part of the vehicle—as, for example, by means of an eccentric connection on the axle—and therefore set in operation whenever the vehicle is in motion then the valve $c$ is a two-way valve, whereby by means of a suitable arm thereon the operator may turn said valve either to direct the air from the compressor into the pipes $b$ or, in case it is not desired to further inflate the tires, may set the valve to allow the air from the compressor to escape to the atmosphere.

If desired, instead of providing the device with the valve $c$ between the air-compressor and the wheel-hub a relief-valve $r$ may be placed on the compressor, which is set to blow off at the maximum pressure which it is desired to carry in the tires, and in that case when the pump is set in motion the air will be forced to that one of the tires only in which the pressure of air is below the maximum.

By means of the herein-described construction a simple and efficient means for inflating the tires of vehicles is provided, which is easily operated to restore the normal pressure to said tires without the loss of time which is incurred when it is necessary to stop the vehicle in order to inflate the tires. Furthermore, in case of a leak in one of the tires pressure may be kept therein to a sufficient degree to avoid the necessity of repairing the leak on the road, provided such leak is not beyond the capacity of the compressor.

Having thus described my invention, what I claim, and desire to secure by Letters Patent of the United States, is—

1. In a self-propelled vehicle, the combination with the hub of a wheel thereof, of an annular chamber thereon rotatable therewith having one open side; an annular head fixed on a stationary part of the vehicle for closing the open side of said chamber, an air-compressing device on the vehicle and an inflatable tire on the wheel; a pipe from the compressing device communicating with said chamber through said head, a pipe from said chamber communicating with the said tire, a check-valve in said last-named pipe, substantially as described.

2. The combination with the hub of the wheel of a self-propelled vehicle, of the casing $e$, the stationary head $f$, and means for hermetically sealing the edge of the latter in said casing, whereby said casing constitutes a chamber for air under pressure; an air-compressing device for supplying air to said chamber; and a conduit from said chamber to the tire of a wheel of the vehicle, substantially as described.

MICHAEL M. SINNOTT.

Witnesses:
WM. H. CHAPIN,
JOHN W. SINNOTT.